United States Patent Office 2,698,159
Patented Dec. 28, 1954

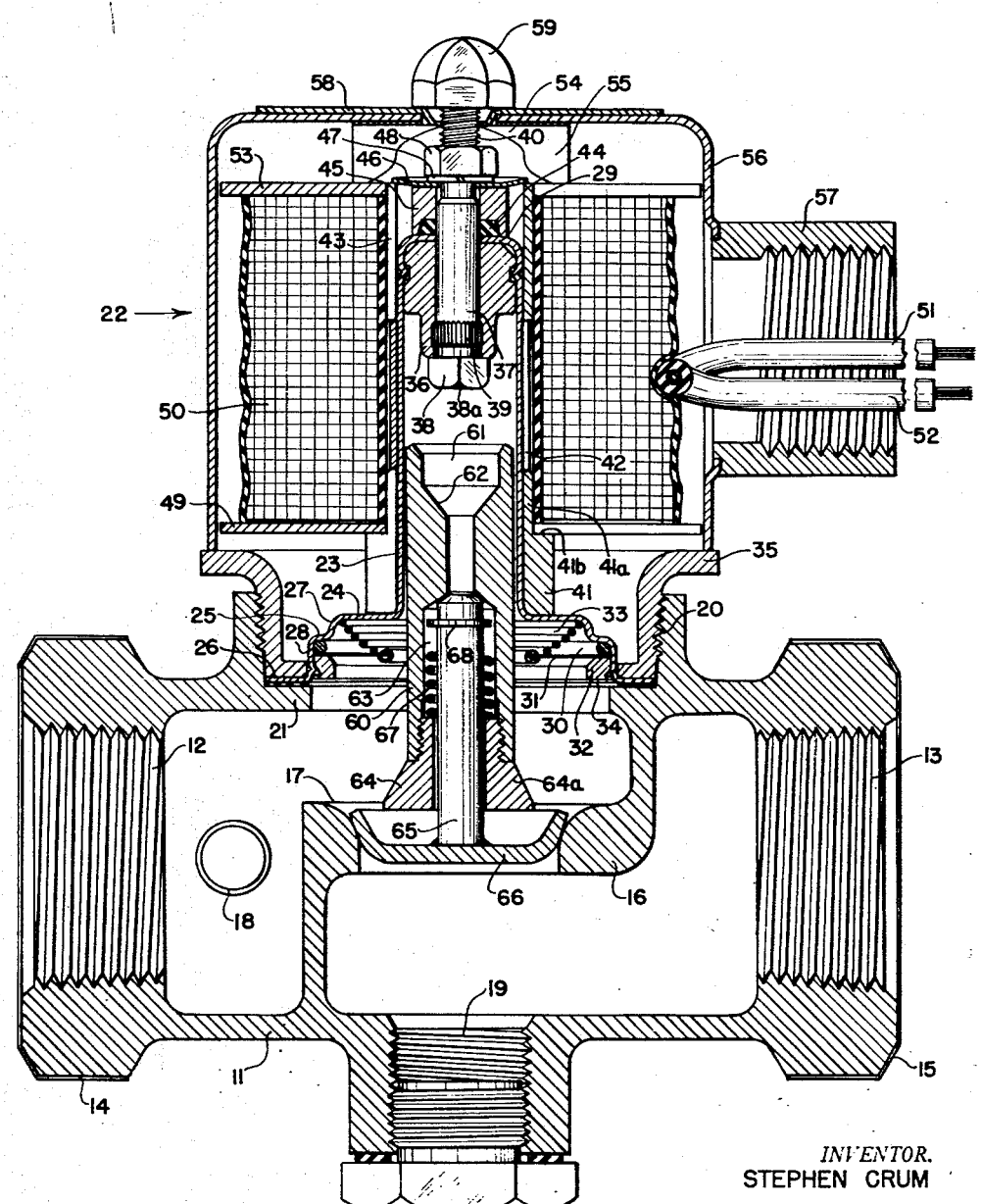

2,698,159

SOLENOID VALVE

Stephen Crum, Richfield, Minn., assignor to Minneapolis-Honeywell Regulator Company, Minneapolis, Minn., a corporation of Delaware Application August 8, 1949, Serial No. 109,124

6 Claims. (Cl. 251—129)

This invention relates to solenoid valves and is more particularly directed to improvements in solenoid constructions, especially suited for valve operation.

One of the principal objects of this invention is to provide a solenoid valve wherein elements of the solenoid portion thereof are resiliently but firmly held in their assembled relationship to prevent vibration thereof.

Another object of this invention is to provide a solenoid structure wherein the elements thereof may be readily disassembled and assembled to facilitate the substitution of coils of different power ratings.

Another object of the invention is to provide a solenoid wherein the flux path from the interior of the solenoid's tube to the wall thereof remains substantially the same regardless of small variations in the lengths of the coils positioned around said tube.

A still further object of the invention is to provide a solenoid construction which is superior to, yet less expensive than prior art constructions.

Further objects of the invention will become apparent upon reading the following detailed description of the invention in conjunction with the accompanying drawing wherein:

The single figure is a vertical sectional view through the improved solenoid and the valve adapted to be actuated thereby.

The valve body, designated by the reference numeral 11, has an inlet connection 12 and an outlet connection 13 protected by metallic cap members 14 and 15, respectively. A partition 16, having a rounded valve seat opening 17 therein, separates the inlet from the outlet. A threaded and plugged opening 18 is provided in the inlet chamber of the valve body for connection by a suitable conduit (not shown) to a pilot burner. A second threaded and plugged opening 19 is provided in the outlet chamber in axial alignment with valve seat opening 17 to provide for the addition of a well known manual opening mechanism (not shown), if it is so desired.

A large threaded opening 20 is provided in the wall of the inlet chamber in axial alignment with valve seat opening 17. An inwardly extending flange 21 at the bottom end of the opening 20 is adapted to support the solenoid, generally designated by the reference numeral 22.

The solenoid comprises a tube 23 made of non-magnetic material, such as brass or copper. The lower end is outwardly flanged in the form of a step-shaped enlarged open end providing transversely extending surfaces 24, 25 and 26, and vertical surfaces 27 and 28. The upper end of the tube 23 has an inwardly extending flange 29 forming an axial opening in said end.

Positioned within the enlarged opening of the tube at the junction of the portions 25 and 28, is a ring which provides an inwardly spaced line-contact bearing surface for a well known type of centering washer 31, such as the one illustrated in Gille patent, No. 2,114,961. The centering washer 31 is retained in abutting relationship with said ring by means of a retaining ring 32 having a peripheral V-shaped notch in its outer surface. The retaining ring is held against the centering washer by deforming a portion of the vertical tube wall 28 into the V-shaped notch. A conically-shaped coil spring 33 is positioned between the lower surface of the wall portion 24 and the center portion of the centering washer 31, to partially absorb the shock of an axially movable solenoid plunger, presently to be described, and to exert a plunger returning force on the plunger when the solenoid is energized. The tube 23 is secured to the valve body by positioning the transversely extending portion 26 of the tube on the inwardly extending flange 21 of the valve body with a washer-shaped gasket 34 therebetween, and then screwing a recessed clamping nut 35 in the threaded opening 20 tightly against the upper surface of the flange portion 26.

Positioned within the tube 23 against the flange 29 is a shading ring 36, made of copper or other suitable material, that is retained within the tube 23 by means of inwardly deformed portions of the tube extending into suitable recesses in the outer surfaces of the shading ring. Extending through the shading ring and outwardly through the flange portion 29 of the solenoid tube 23, is a centering pin 37 having a head portion 38 adapted to bear against the lower end of the shading ring, a knurled portion 39 adapted to bite into the inner wall surface of the shading ring, so as to prevent rotation therebetween, and a threaded portion of reduced diameter extending outwardly a substantial distance beyond the end of the solenoid tube.

Circling solenoid plunger tube 23 and resting on the transversely extended portion 24 thereof, is a split sleeve 41 of magnetic material. An upwardly extending portion 41a, of reduced external diameter, forms a shoulder portion 41b on the sleeve for a purpose to be described hereinafter. Another split sleeve 42, made of non-magnetic material, snugly encircles the solenoid tube and rests on the upper end of the reduced diameter portion 41a of sleeve 41. Still another split sleeve 43, made of magnetic material, snugly encircles the upper portion of the solenoid tube and bears against the upper end of the sleeve 42.

Bearing against the centering pin 37 and the outer surface of the flange 29, is a sealing ring 44 of rubber or other suitable material. This sealing ring 44 is tightly squeezed against the centering pin and the outer surface of the flange 29 by means of a downwardly flanged washer 45. A resilient washer 46 is positioned around the centering pin 47 with its peripheral edge resting on the outer end of the sleeve 43. The axial length of the washer 45 is such that the outer end thereof is spaced inwardly of the end of the sleeve 43. Therefore, when a lock washer 47 is positioned over the pin 37 and nut 48 is threaded onto the pin, so as to force the lock washer and the spring washer inwardly against the flanged washer 45 and to tightly squeeze the sealing washer against the pin and flange 29, the sleeve 43 will be resiliently but strongly and firmly pressed against the spacing sleeve 42. Sleeve 42 will in turn be firmly pressed against the sleeve 41 which will likewise be pressed against the upper surface of the transversely extended portion 24 of the plunger tube 23. It will thus be seen that the plunger tube and the above described elements secured thereto form an assembly unit that accurately and positively positions the outer end of the magnetic sleeve 41 and the inner end of the magnetic sleeve 43 with respect to the inner end of the centering pin 37. This accurate positioning of the inner end of the sleeve 43 with respect to the inner end of the magnetic pin 37 is particularly important to obtain the optimum efficiency in the solenoid's operation.

Positioned on the shoulder 41b of the magnetic sleeve 41 and substantially encircling the portion 41a thereof, is a split washer 49 of magnetic material. Positioned on the washer 49 and encircling portions of sleeves 41 and 43 and all of sleeve 42, is a coil of wire 50 having leads 51 and 52 for connection to a source of electrical energy. Positioned above the coil and substantially encircling the sleeve 45, is a second split washer 53 of magnetic material.

The use of split washers and split sleeves is for the purpose of preventing the induction of electrical current therein when the coil is energized, and the setting up of an additional flux field which reduces the operating efficiency of the desired flux field for operation of the solenoid. The use of split washers and sleeves for this purpose is well known in the art and is illustrated in a Ray et al. patent, Re. 21,881.

In order to hold the coil and the washers 49 and 53 in position and to prevent vibration thereof, a leaf spring 54, having three or more inwardly extending legs 55 spaced annularly around the centering pin 37 and bearing on the outer surface of the washer 53, is apertured at its central portion so as to fit around the centering pin 37. An inverted cup-shaped housing member 56 having an aperture in the closed end portion thereof to receive the outer end portion of the centering pin 37 is so proportioned as to permit the open end portion to rest on the top clamping surface of the clamping nut 35 when the valve is assembled. Secured in an opening in the cylindrical wall portion of the housing 56 is an electrical conduit connector 57 through which the leads 51 and 52 of the coil extend. A name plate 58 is shown positioned on the top surface of the housing and encircling the centering pin 37. A nut 59 is screw-threaded on the end of the pin 37 sufficiently far to hold the name plate 58 on the housing 56, flex the spring 55 sufficiently to hold firmly the washer 53 against the coil 50 and the coil 50 against the washer 49, etc., and to bring the open lower end of the housing 56 into tight engagement with the top surface of the clamping nut 35.

It will be noted that with the arrangement of parts just described, it is possible for coils of varying sizes, both in length and in thickness, to be used and still be tightly held in place without materially affecting the flux paths through the rest of the elements of the solenoid. This enables the use of coils of less expensive construction, due to the fact that the dimensions thereof are not required to be held to critical tolerances.

If desired, the axial length of the coil 50 could be materially increased with applicant's valve construction by lowering the shoulder 41b of sleeve 41 or by making the sleeve 41 of the same external diameter as the portion 41a thereof. This alteration would of course necessitate a reduction in the outer diameter of the washer 49 so as to permit it to fit in the recessed portion of the nut 35. Such a lengthening of the coil 50 would also necessitate the reduction in the outside diameter of the coil to likewise fit in the recessed portion of the nut 35, should the coil be lowered to that extent.

Positioned within the solenoid tube 23 is a solenoid plunger 60 of well-known construction. It is of general cylindrical shape with an enlarged recess 61 having an inwardly and downwardly beveled surface 62 adapted to engage complementary shaped and spaced surfaces 38a on the head of the centering pin 37 to stop the inward movement of the plunger. The lower end of the tube has an enlarged recessed portion 63 with a plug 64 secured in the outer open end thereof by any suitable means, such as by deforming portions of the plunger wall into recesses in said plug. The plug is axially bored to receive a stem 65 of a cup-shaped valve 66 that is adapted to cooperate with the valve seat 17. Positioned within the recess 63 is a coil spring 67 which surrounds the stem 65 and bears against the upper end of the plug 64. This spring is approximately one-half the length of the recess 63 and is provided to reduce the shock imparted to the valve stem 65 when the solenoid plunger pulls into the tube, due to energization of the coil. The inward movement of the plunger is transmitted to the stem 65 and therefore the valve 66 by having the upper end of the coil spring 67 engage a conventional split washer 68 engaged in an angular groove in the upper end of the stem 65.

The valve is shown in its closed position. Upon energization of the coil, the plunger 60 will be drawn inwardly or upwardly into the tube 23 in a manner well known in the art. The upper end of the spring 67 will first come into engagement with the washer 68 to unseat the valve head 66 from the seat 17. Further movement of the plunger will bring conical surface 64a of the plug 64 into engagement with the centering washer 31 and still further movement will compress the spring 33 and bring the beveled surface 62 of the plunger into engagement with surfaces 38a of the centering pin head 38. The plunger will be held tightly against the centering pin so long as the coil is energized.

Upon deenergization of the coil, the weight of the plunger and valve and the bias of the spring 33 and the washer 31 will quickly return valve 66 to its closed position.

While the preferred embodiment of the invention has been disclosed above, it is to be understood that other modifications may be made without departing from the spirit of the invention. Therefore, the scope of the invention should be determined by the appended claims and not by the specific disclosure of the preferred embodiment thereof.

I claim as my invention:

1. In a solenoid valve having a hollow valve body with an opening at one side thereof, an inlet, an outlet, an apertured partition between said inlet and outlet, and a valve seat in said apertured partition in axial alignment with said opening; the combination comprising a tube having a first outwardly extending flange at one of its ends and shaped to be positioned on the marginal edge of said opening and a second inwardly extending flange at its other end; means for holding said first flange on said edge; a first sleeve of magnetic material encircling said tube and bearing against said first flange, said sleeve having an outer portion of reduced external diameter providing a shoulder; a washer of magnetic material encircling said portion and bearing against said shoulder; a second sleeve of non-magnetic material encircling said tube and having one end thereof bearing against the outer end of said first sleeve; a third sleeve of magnetic material encircling said tube and having one end thereof bearing against the other end of said second sleeve, the other end of said third sleeve extending beyond the second flanged end of the tube; a shading ring positioned within said tube with a first end thereof bearing against said second flange and a second end having a portion of reduced external diameter; a centering pin of magnetic material extending through and beyond said shading ring and second flange, said pin having a head portion bearing against said shading ring and a threaded portion extending outwardly of said tube; a packing sleeve encircling said pin and bearing against the outer surface of said second flange; a resilient member encircling said pin and bearing against said other end of said third sleeve and normally being slightly spaced from said packing sleeve; a nut threaded upon said pin to a position wherein a central portion of said resilient member is flexed inwardly into engagement with said packing sleeve to form a fluid tight seal between said pin and said second flange and to hold said third sleeve against said second sleeve; a coil of wire encircling said second sleeve and at least a portion of each of the first and third sleeves; a second washer of magnetic material encircling said third sleeve; an inverted cup-shaped housing enclosing said washers and coil and having an opening in the closed end thereof through which said pin extends; means on said pin for retaining said housing; a resilient member between said second washer and the closed end of said housing for holding said second washer against said coil and said coil against said first washer; and a plunger of magnetic material positioned within said tube and having a recess at one end thereof to receive the head of said centering pin.

2. A solenoid comprising a solenoid tube having an inner end and an outer end; a non-magnetic sleeve having an inner end and an outer end substantially encircling said tube, means holding said sleeve a predetermined distance from said inner end of said tube, a magnetic sleeve substantially encircling said tube and bearing against said outer end of said non-magnetic sleeve, means including a resilient means concentrically positioned on said tube and supported thereby for biasing said magnetic sleeve against said non-magnetic sleeve, a coil of wire encircling said sleeves, a magnetic washer encircling said magnetic sleeve, further resilient means operatively connected to said tube for holding said washer against said coil, and a plunger in said tube.

3. In a solenoid valve having an inlet and an outlet and a valve controlled aperture in a partition therebetween, the combination comprising a solenoid tube having an inner end and an outer end, a non-magnetic sleeve having an inner end and an outer end substantially encircling said tube, means holding said sleeve a predetermined distance from said inner end of said tube, a magnetic sleeve substantially encircling said tube and bearing against said outer end of said non-magnetic sleeve, means including a spring on said tube biasing said magnetic sleeve against said non-magnetic sleeve, a coil of wire encircling said sleeves, a magnetic washer encircling said magnetic sleeve, resilient means for holding said washer against said coil, and a plunger in said tube.

4. A solenoid comprising a tube having an open end and a closed end, a pin extending outwardly from said closed end, a first sleeve of non-magnetic material partially encircling an intermediate portion of said tube in physical contact therewith, means holding said sleeve in a predetermined position from the open end of said tube, a second sleeve of magnetic material partially encircling the closed end portion of said tube, means including a resilient means mounted on said pin holding said second sleeve against said first sleeve, a coil of wire encircling said sleeves, a washer of magnetic material substantially encircling said second sleeve, a housing enclosing said washer and coil and engaging said pin, resilient means bearing against said washer and housing, and a plunger in said tube.

5. A solenoid tube assembly comprising a tube having a first open end and a second closed end, a first member of non-magnetic material partially encircling an intermediate portion of said tube in contact therewith, means for holding said first member a predetermined distance from the first end, a second member of magnetic material partially encircling said tube at the second end thereof, a pin of magnetic material extending through an aperture in the second end of the tube, means forming a fluid tight seal between said pin and tube, and means including a resilient means on said pin holding said second member against said first member.

6. A solenoid tube assembly comprising a tube having a first open end and a second closed end, a first member of non-magnetic material partially encircling an intermediate portion of said tube in contact therewith, means for holding said first member a predetermined distance from the first end, a second member of magnetic material partially encircling said tube at the second end thereof, a pin extending through an aperture in the second end of the tube, means forming a fluid tight seal between said pin and tube, and means including a resilient means on said pin holding said second member against said first member.

References Cited in the file of this patent

UNITED STATES PATENTS

| Number | Name | Date |
| --- | --- | --- |
| Re. 21,881 | Ray | Aug. 19, 1941 |
| 906,331 | Struble | Dec. 8, 1908 |
| 1,209,646 | Reed | Dec. 19, 1916 |
| 1,978,737 | Bower | Oct. 30, 1934 |
| 2,098,195 | Ray | Nov. 2, 1937 |
| 2,098,197 | Ray | Nov. 2, 1937 |
| 2,114,961 | Gille | Apr. 19, 1938 |
| 2,324,642 | Peterson | July 20, 1943 |
| 2,383,411 | Obszarny | Aug. 21, 1945 |
| 2,458,123 | Wasserlein | Jan. 4, 1949 |
| 2,562,392 | Ray | July 31, 1951 |

FOREIGN PATENTS

| Number | Country | Date |
| --- | --- | --- |
| 566,211 | Great Britain | Dec. 19, 1944 |
| 568,867 | Great Britain | Apr. 24, 1945 |